(No Model.)                J. BENDER.                6 Sheets—Sheet 1.
                           COW MILKER.
No. 583,165.                          Patented May 25, 1897.
Fig. I.
Witnesses
E. N. Monroe
H. J. Tunis.
Inventor
John Bender,
By. H. B. Willson.
Attorney (No Model.) 6 Sheets—Sheet 2.
J. BENDER.
COW MILKER.
No. 583,165. Patented May 25, 1897.
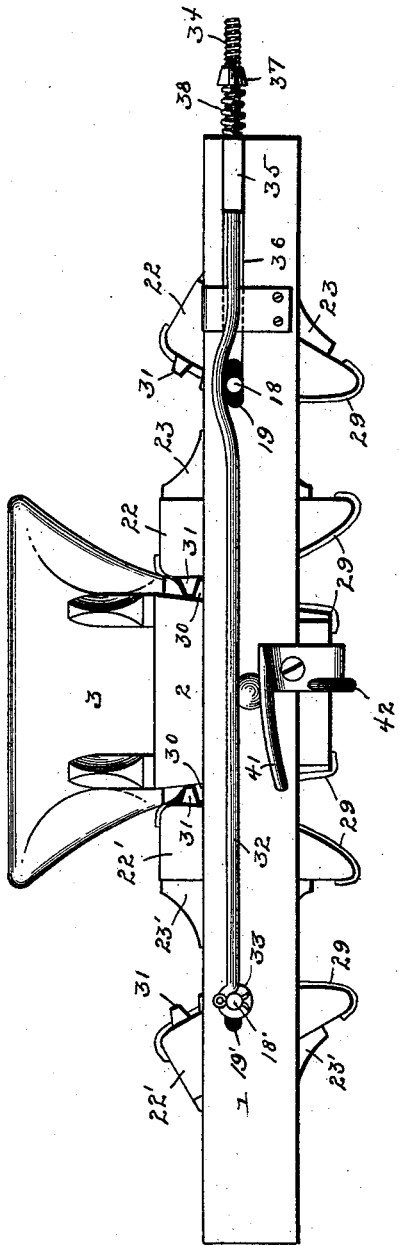
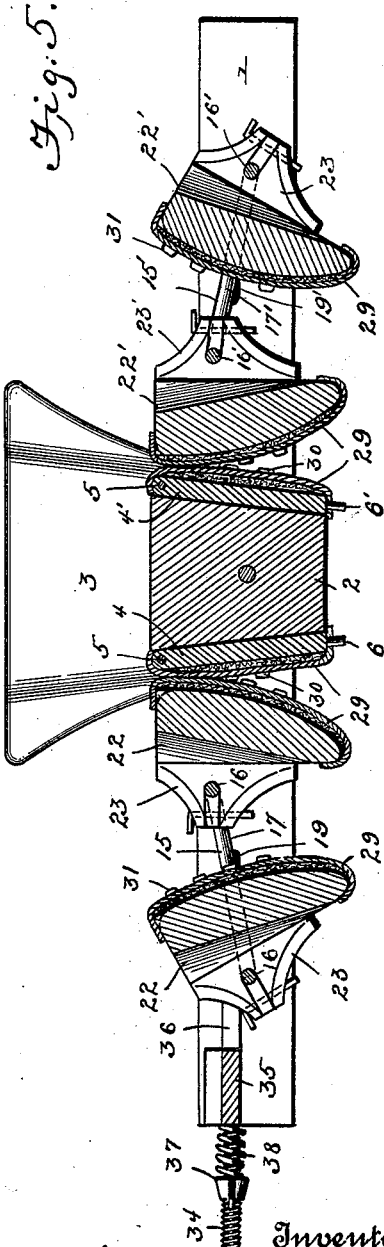
Witnesses
Est. Monroe
H. J. Curtis
Inventor
John Bender
By H. B. Willson
Attorney
THE NORRIS PETERS CO., PHOTO-LITHO., WASHINGTON, D. C.

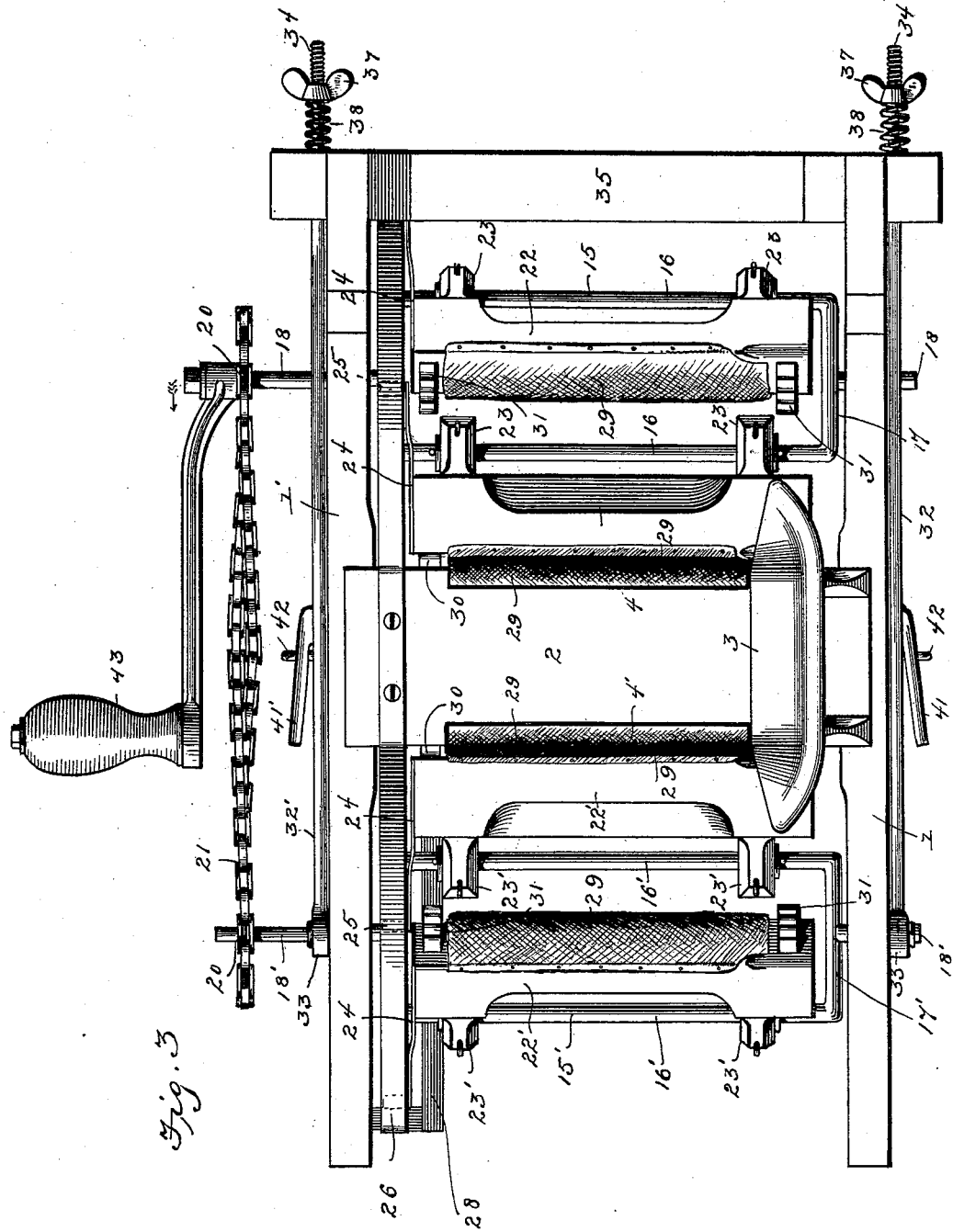

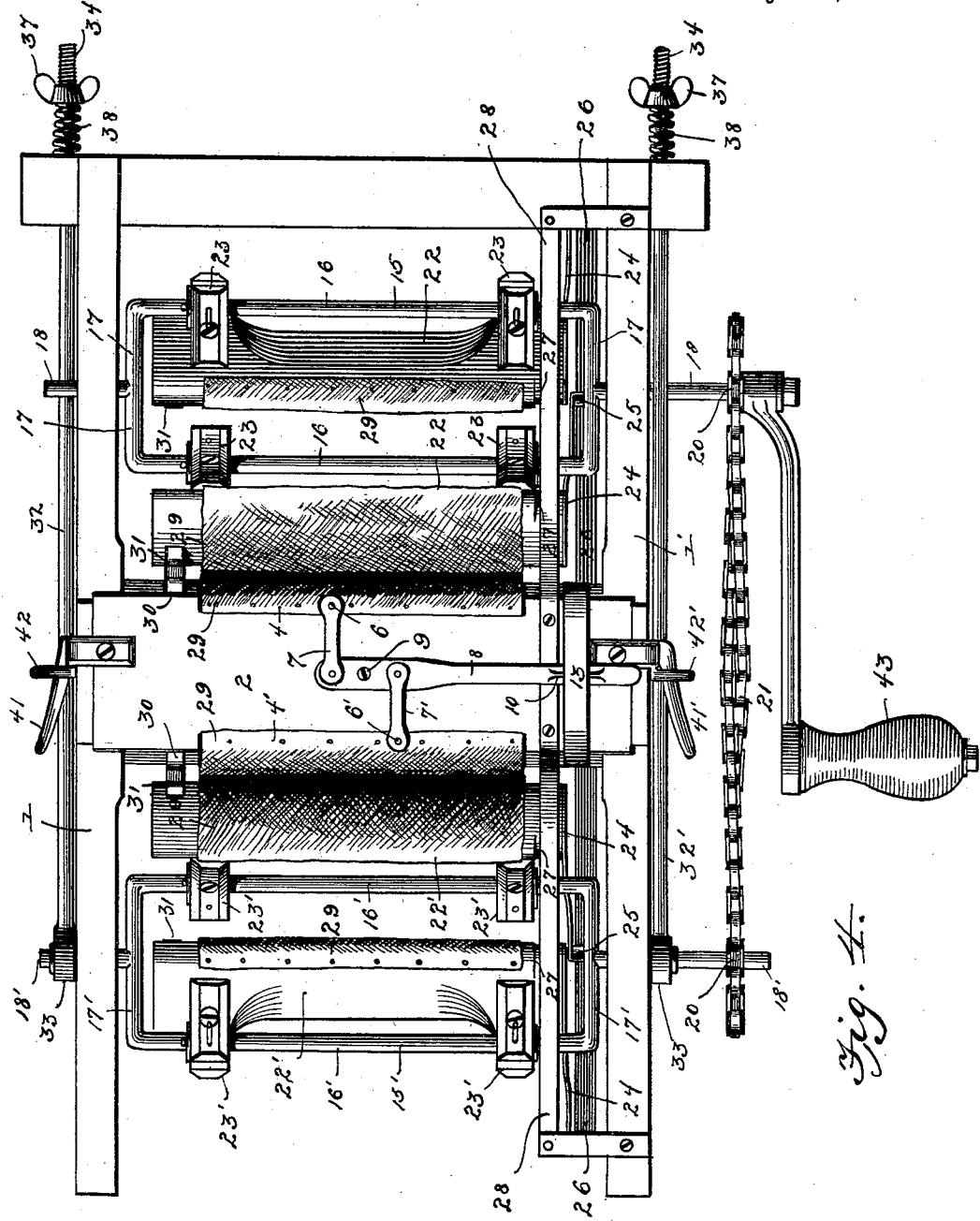

(No Model.) 6 Sheets—Sheet 5.
J. BENDER.
COW MILKER.
No. 583,165. Patented May 25, 1897.
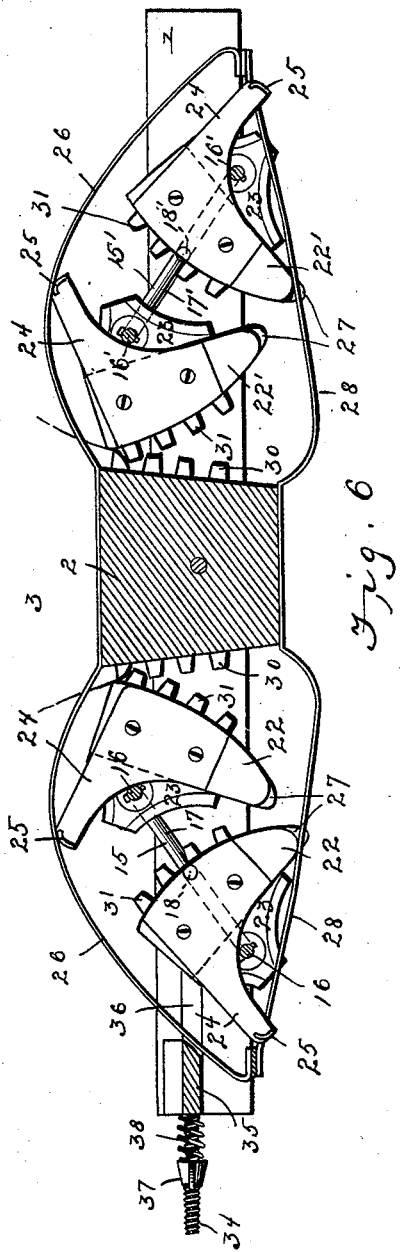
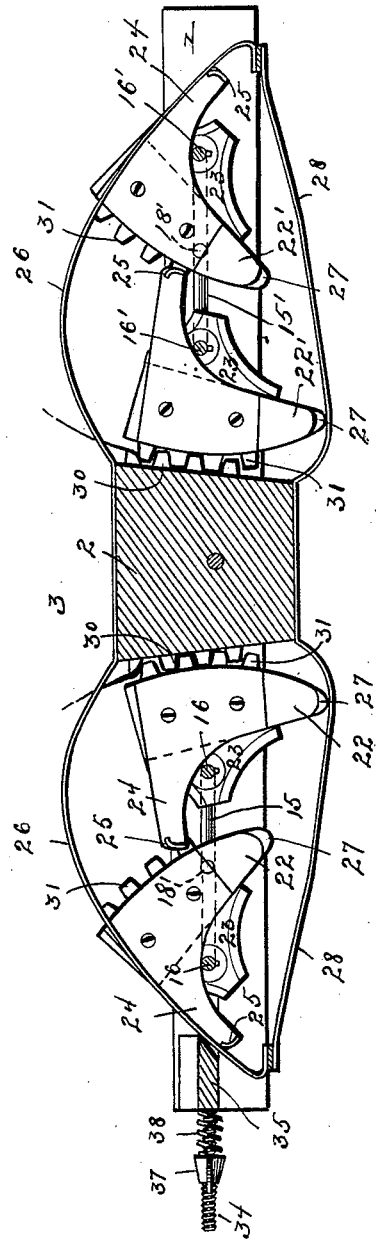
Witnesses
E. St. Monroe
H. J. Ennis
Inventor
John Bender
By H. B. Willson.
Attorney (No Model.) 6 Sheets—Sheet 6.
J. BENDER.
COW MILKER.
No. 583,165. Patented May 25, 1897.
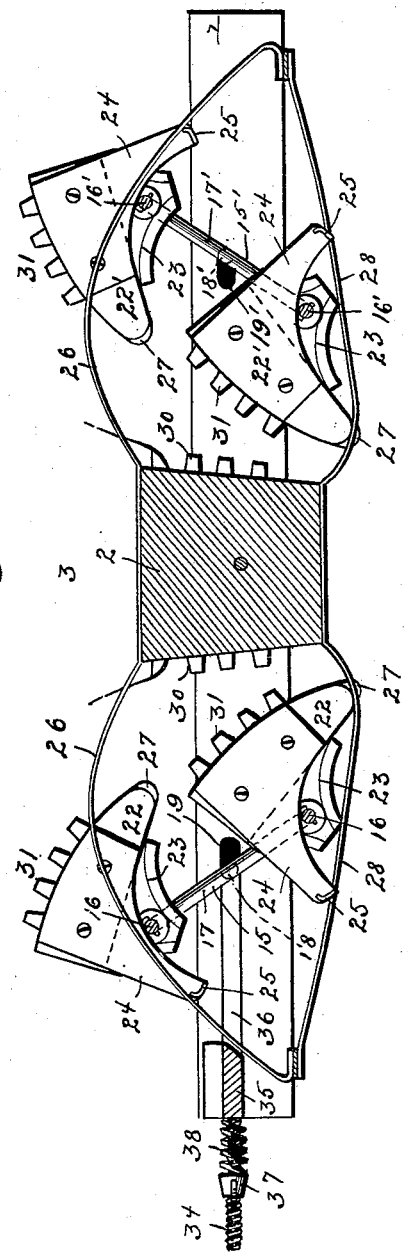
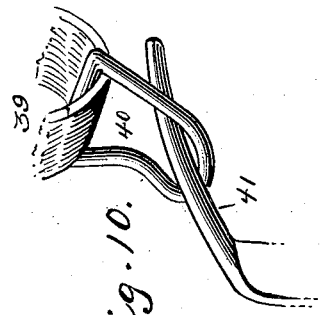
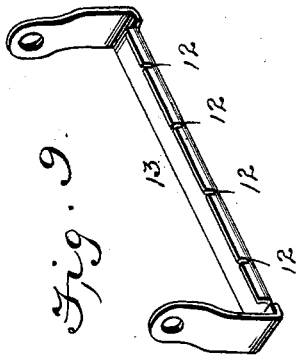
Witnesses
E. N. Monroe
H. J. Ennis
Inventor
John Bender.
By H. B. Willson.
Attorney
THE NORRIS PETERS CO., PHOTO-LITHO., WASHINGTON, D. C.

UNITED STATES PATENT OFFICE.

JOHN BENDER, OF NEWTON, KANSAS.

COW-MILKER.

SPECIFICATION forming part of Letters Patent No. 583,165, dated May 25, 1897.

Application filed October 28, 1896. Serial No. 610,329. (No model.)

*To all whom it may concern:*

Be it known that I, JOHN BENDER, a citizen of the United States, residing at Newton, in the county of Harvey and State of Kansas, have invented certain new and useful Improvements in Cow-Milkers; and I do declare the following to be a full, clear, and exact description of the invention, such as will enable others skilled in the art to which it appertains to make and use the same.

My invention has relation to improvements in devices for milking cows mechanically instead of manually; and the object is to simulate and imitate the action of the human hand in manipulating the cow's teat in the operation of milking; also to have the apparatus adjustable not only to animals of different proportions, but also to differences in the size, length, and location of the teats on the udder, so that the device is adapted for milking any cow.

To these ends the novelty consists in the construction, combination, and arrangement of the several parts of the same, as will be hereinafter more fully described, and particularly pointed out in the claims.

In the accompanying drawings the same figures of reference indicate the same parts of the invention.

Figure 1 is a perspective view of a cow, showing my improved milker in position. Fig. 2 is a side elevation of the milker. Fig. 3 is a top plan view. Fig. 4 is a bottom plan view. Fig. 5 is a central longitudinal section. Fig. 6 is a longitudinal section showing the position of the followers in the act of compressing the teats. Fig. 7 is a similar view showing the position of the followers when the teats are fully compressed. Fig. 8 is another view showing the followers in the act of releasing the teats. Fig. 9 is a detail perspective view of the lever-holding guard 13, and Fig. 10 is a similar view of the lower end of one of the securing-straps.

1 represents two parallel side pieces rigidly secured together by a suitable central brace 2, the upper part of which is provided with a flaring shield 3.

4 4' represent vertical plates pivoted at their upper ends to a transverse rod 5, secured to the sides of the stationary brace 2, and their lower ends are provided with studs 6 6, to which are pivoted the outer ends of the connecting-rods 7 7, the inner ends of which are pivoted to a hand-lever 8 on opposite sides of its fulcrum-bolt 9, secured to the under side of the brace 2. The outer end of said lever near its handle is formed with a web 10, which engages a series of notches 12 in a guard 13, secured to the brace 2, and which serves to hold the lever in the position to which it may be adjusted. The object of this lever is to regulate the distance between the plates 4 4' corresponding to the transverse distance between the teats on each side of the udder.

15 15' represent two rectangular frames comprising the parallel rods 16 16', the end bars 17 17', and the shafts 18 18', which are journaled in recesses or slots 19 19' in the side pieces 1 1'. One end of each of these shafts 18 18' is provided with a sprocket-wheel 20 and a crossed sprocket-chain 21, which serves to revolve the frames inwardly from opposite directions toward the plates 4 4'.

22 22' represent followers having arms 23 23, which are journaled on the parallel rods 16 16', and 24 is a guide-arm having an angular toe 25, which travels inside of the upper guide-rail 26 to guide the followers in approaching the plates, and a recess 27 in the lower end of the followers travels over the lower guide-rail 28 to guide the followers as they are receding from the plates. The outsides of both of the plates and the followers are preferably convex in form and are provided with felt or other suitable elastic cushions 29. The outer edges of the curved face of the plates 4 4' are provided with a series of stationary teeth 30, which serve to engage a similar series of teeth 31 on the ends of the face of the followers, so that each follower approaches and recedes from its contiguous plate with a gradually increasing and diminishing pressure without any rubbing motion whatever, thereby avoiding all possibility of abrading the teats by frictional rubbing. It will be noticed in Fig. 6 that the followers press the teats at the base of the udder against the plate and gradually bring this pressure downward to the ends of the teats, as shown in Figs. 7 and 8.

32 32 represent two rods lying parallel with the side pieces 1 1', one end of each of which is provided with eyes 33, which encompass the shafts of rectangular frame 15', their opposite ends 34 being screw-threaded and extending through a bar 35, sliding in the horizontal slot 19 in one end of the side pieces. These screw-threaded ends are provided with thumb-nuts 37, and a spiral spring 38 encompasses the rods, one end resting against the thumb-nut and the other against the bar 35.

36 36 represent horizontal blocks located in the slots 19, one end resting against the inside of the bar 35 and the other against the journal-shafts of the frame 15, and it will thus be seen that by means of the thumb-nuts and spiral springs the requisite degree of elastic compression can be given to the followers when pressing the teats against the plates 4 4'.

39 represents the adjustable harness provided with links 40, which engage the hooks 41 41' on the side pieces and support the milker in position when in use. The milk-pail is suspended from the hook 42, and by operating the crank-handle 43 the followers are caused to approach and recede from the plates in regular order, and, as above described, first engage the teat at its base and gradually bring the pressure downward to the point, thereby extracting the milk from the udder in a natural, regular, and easy manner.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A cow-milking apparatus, comprising the side pieces 1 1', the central brace 2, the plates 4 4' pivoted at their upper ends to said brace, and provided at their lower ends with studs 6 6, the lever 8 fulcrumed to said brace 2 by the bolt 9, and the connecting-rods 7 7 connecting said lever with the studs on the pivoted plates, substantially as and for the purpose set forth.

2. A cow-milking apparatus, comprising the side pieces 1 1', the central brace 2, the cushioned plates pivoted thereto, the rectangular revolving frames 15 15' journaled in said side pieces, the convex-faced cushioned followers mounted in said frames, and the rods 32, one end of which encompasses the shafts of the frame 15' and the other end passing through a transverse bar 35 sliding longitudinally in slots 19 in the side pieces, the thumb-nuts 37, the springs 38, and the sliding blocks 36, substantially as and for the purpose set forth.

3. A cow-milking apparatus, comprising the side pieces, the central brace, and the cushioned plates 4 4' pivoted thereto and provided with a series of teeth 30, in combination with the revolving rectangular frames 15 15' journaled in said side pieces, and the convex-faced cushioned followers mounted in said frames and provided on their convex faces with a series of teeth 31, adapted to engage the teeth on the plates, substantially as and for the purpose set forth.

In testimony whereof I hereunto affix my signature in presence of two witnesses.

JOHN BENDER.

Witnesses:
C. W. GOSS,
A. B. GILBERT.